(12) United States Patent
Hamadate et al.

(10) Patent No.: US 11,946,677 B2
(45) Date of Patent: Apr. 2, 2024

(54) REFRIGERANT FLOW PATH UNIT AND REFRIGERATION APPARATUS

(71) Applicant: DAIKIN INDUSTRIES, LTD., Osaka (JP)

(72) Inventors: Junichi Hamadate, Osaka (JP); Fumiaki Koike, Osaka (JP); Asahi Ono, Osaka (JP); Ayumi Kubo, Osaka (JP); Masato Okuno, Osaka (JP); Naritaka Yakura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/476,601

(22) Filed: Sep. 28, 2023

(65) Prior Publication Data

US 2024/0027113 A1 Jan. 25, 2024

Related U.S. Application Data (63) Continuation of application No. PCT/JP2022/016001, filed on Mar. 30, 2022.

(30) Foreign Application Priority Data

Mar. 31, 2021 (JP) ................................. 2021-059693

(51) Int. Cl.
*F25B 41/40* (2021.01)
*B23K 1/00* (2006.01)

(52) U.S. Cl.
CPC ............ *F25B 41/40* (2021.01); *B23K 1/0012* (2013.01)

(58) Field of Classification Search
CPC .................................. F24F 1/26; B23K 1/0012
See application file for complete search history.

(56) References Cited

U.S. PATENT DOCUMENTS

| 6,394,179 B1 | 5/2002 | Blomgren et al. |
| 2016/0195335 A1 | 7/2016 | Nishiyama et al. |

FOREIGN PATENT DOCUMENTS

| JP | S49-130548 A | 12/1974 |
| JP | H07-198229 A | 8/1995 |
| JP | H09-79616 A | 3/1997 |
| JP | 2000274988 A | 10/2000 |
| JP | 2002-539407 A | 11/2002 |

(Continued)

OTHER PUBLICATIONS

Translation JP-2016044896-A.*

(Continued)

*Primary Examiner* — Elizabeth J Martin
(74) *Attorney, Agent, or Firm* — Osha Bergman Watanabe & Burton LLP (57) ABSTRACT

A refrigerant flow path unit includes: a unit body that includes plates that are laminated together, and has an interior in which a refrigerant flow path is formed; a refrigerant pipe; and a first brazing filler metal that joins the unit body to the refrigerant pipe. The plates of the unit body include: a first plate that has a first opening and is disposed at an end of the unit body in a first direction in which the plates are laminated; and a second plate that has a second opening that communicates with the first opening and is disposed second from the end of the unit body in the first direction. The refrigerant pipe is inserted into the first opening and the second opening.

12 Claims, 7 Drawing Sheets

(56) References Cited

FOREIGN PATENT DOCUMENTS

| | | | |
|---|---|---|---|
| JP | 2010-156528 A | | 7/2010 |
| JP | 2014-185803 A | | 10/2014 |
| JP | 2016-44896 A | | 4/2016 |
| JP | 2016044896 A | * | 4/2016 |
| WO | 2015/004719 A1 | | 1/2015 |
| WO | WO-2015004719 A1 * | 1/2015 | ............ B21D 53/08 |
| WO | 2017/103965 A1 | | 6/2017 |

OTHER PUBLICATIONS

Translation WO-2015004719-A1.*
International Search Report issued in corresponding International Application No. PCT/JP2022/016001 dated Jun. 21, 2022 (3 pages).
Notice of Reasons for Refusal issued in corresponding Japanese Application No. 2021-059693 dated Oct. 25, 2022 (8 pages).
Decision to Grant a Patent issued in corresponding Japanese Application No. 2021-059693 dated Mar. 28, 2023 (5 pages).
English translation of International Preliminary Report on Patentability issued in corresponding International Application No. PCT/JP2022/016001, dated Oct. 3, 2023 (6 pages).

* cited by examiner

REFRIGERANT FLOW PATH UNIT AND REFRIGERATION APPARATUS

TECHNICAL FIELD

The present disclosure relates to a refrigerant flow path unit and a refrigeration apparatus.

BACKGROUND

In a known refrigeration apparatus including a refrigerant circuit for vapor compression refrigeration cycle operation, a plurality of refrigerant pipes through which a refrigerant flows are combined into one in order to reduce the size of the refrigerant circuit. For example, Patent Literature 1 discloses a substrate (refrigerant flow path unit) having an upper substrate and a lower substrate laminated together and having a refrigerant flow path formed therein. A hole is formed in the upper substrate of the substrate, and an auxiliary pipe connected to a compressor, a heat exchanger, and the like is connected to the hole.

PATENT LITERATURE

PATENT LITERATURE 1: Japanese Laid-Open Patent Publication No. H9-79616

SUMMARY

A refrigerant flow path unit according to the present disclosure includes:
  a unit body including a plurality of plates that are laminated together, and having an interior in which a refrigerant flow path is formed;
  a refrigerant pipe;
  a first brazing filler metal that joins the unit body to the refrigerant pipe, in which
  the unit body includes a first plate formed with a first opening and a second plate formed with a second opening that communicates with the first opening, the second plate being laminated to the first plate, and
  the refrigerant pipe is inserted into the first opening and the second opening, and
  the first brazing filler metal joins an inner peripheral surface of the first opening and an inner peripheral surface of the second opening to an outer peripheral surface of the refrigerant pipe.

DETAILED DESCRIPTION

Hereinafter, embodiments of the present disclosure will be described in detail with reference to the accompanying drawings.

Embodiments 1

Figure 1:
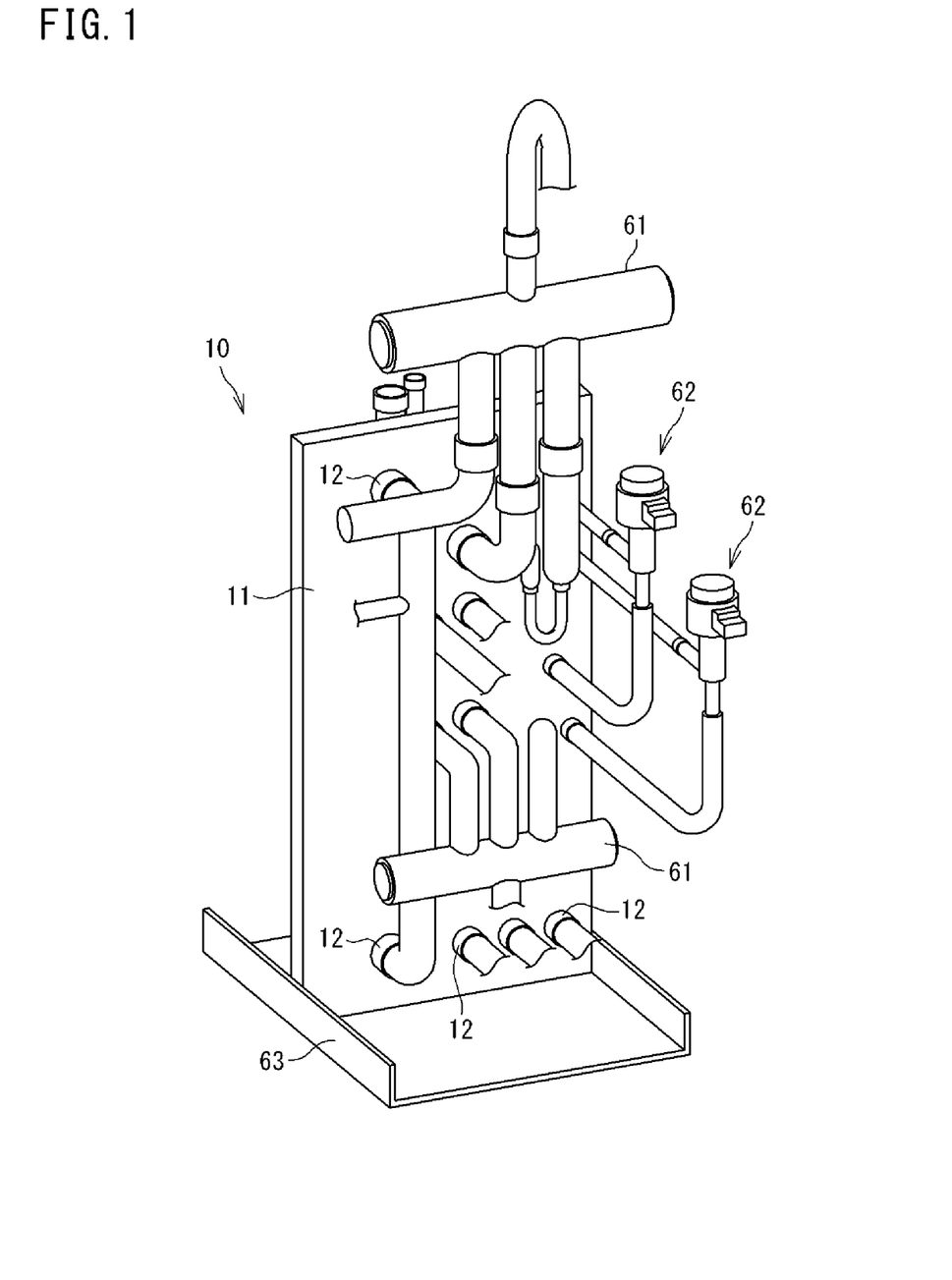
FIG. 1 is a perspective view of a refrigerant flow path unit according to first embodiments of the present disclosure as viewed from one side.
Figure 2:
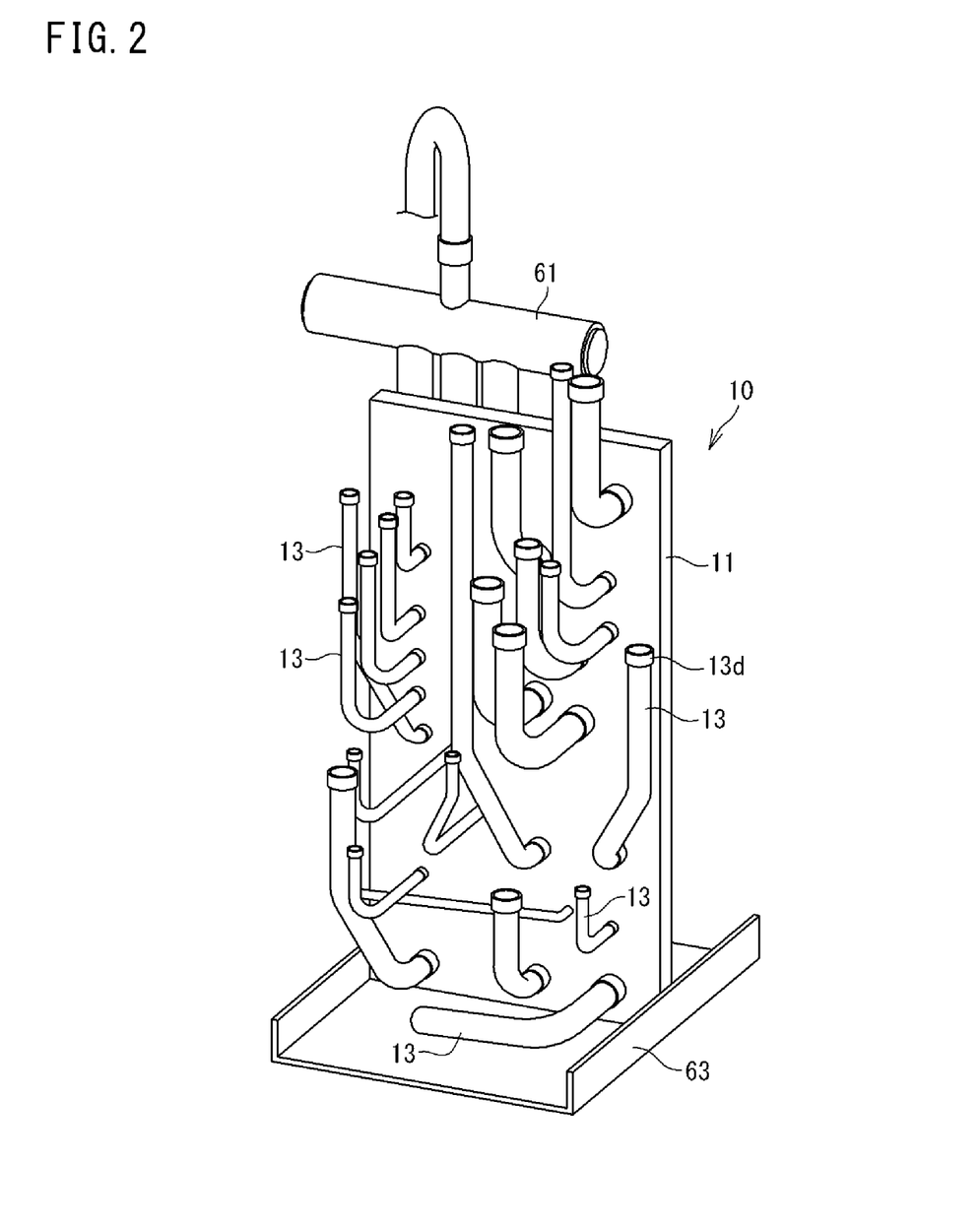
FIG. 2 is a perspective view of the refrigerant flow path unit according to the first embodiments of the present disclosure as viewed from the other side.
Figure 3:
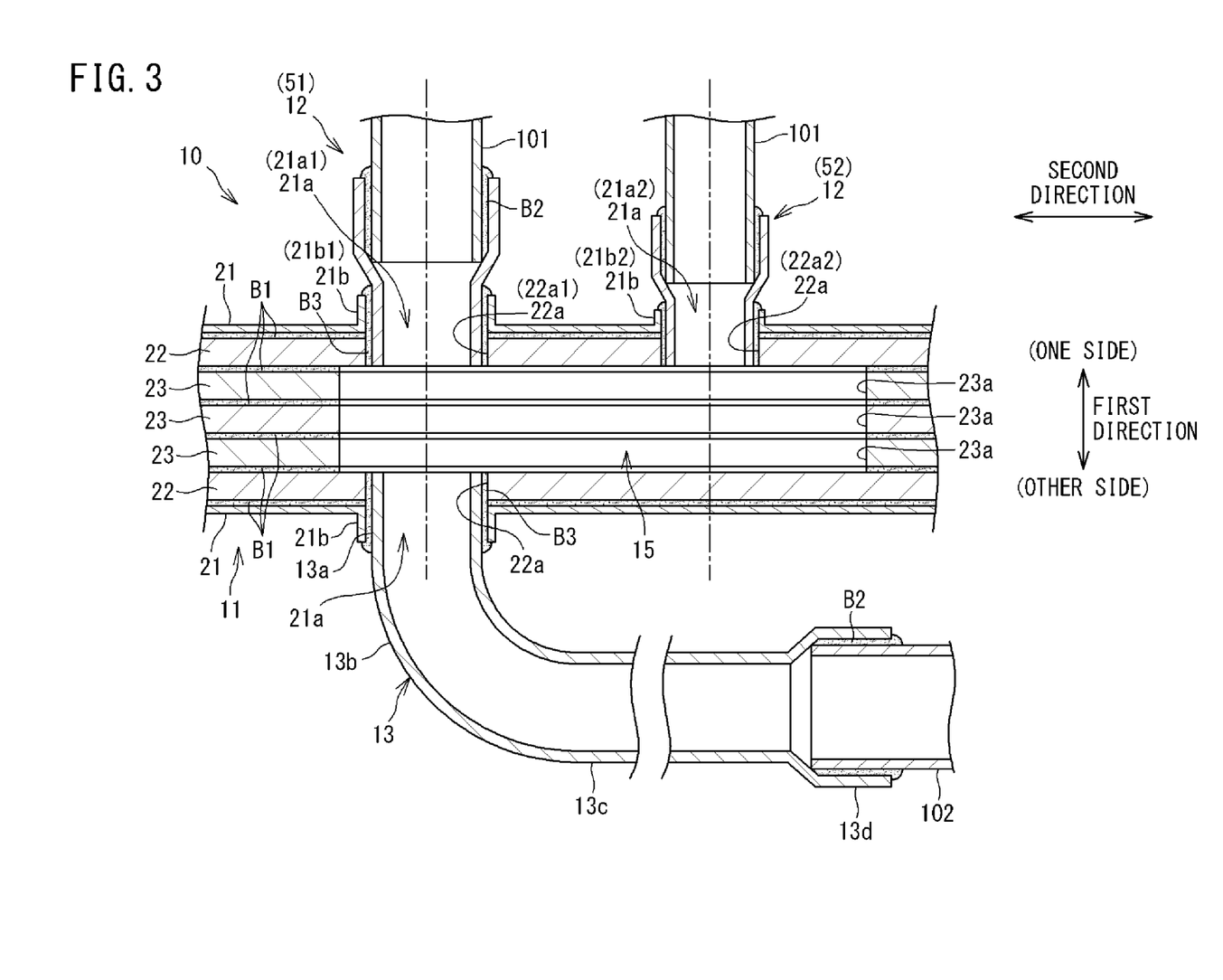
FIG. 3 is a cross-sectional view of portions of the refrigerant flow path unit.

FIG. 1 is a perspective view of a refrigerant flow path unit according to first embodiments of the present disclosure as viewed from one side. FIG. 2 is a perspective view of the refrigerant flow path unit according to the first embodiments of the present disclosure as viewed from the other side. FIG. 3 is a cross-sectional view of portions of the refrigerant flow path unit.

A refrigerant flow path unit 10 according to one or more embodiments is applied to, for example, a refrigeration apparatus including a refrigerant circuit for vapor compression refrigeration cycle operation. Examples of the refrigeration apparatus include air conditioners, refrigerators, freezers, and water heaters.

Devices such as a four-way switching valve, an electric valve, a compressor, an accumulator, and an oil separator that constitute the refrigerant circuit are connected to the refrigerant flow path unit 10. For example, as illustrated in FIG. 1, functional components, such as a four-way switching valve 61 and an electric valve 62, are connected to one surface of the refrigerant flow path unit 10. The refrigerant flow path unit 10 according to one or more embodiments is fixed in a standing orientation (with the plate surface along the vertical direction) to the bottom plate of an air conditioner or the like, for example, with a support base 63 interposed therebetween.

As illustrated in FIG. 3, the refrigerant flow path unit 10 has a unit body 11, a first joint pipe 12 that is a refrigerant pipe, and a second joint pipe 13 that is a refrigerant pipe. The unit body 11 has a plurality of plates 21, 22, and 23. The plurality of plates 21, 22, and 23 are laminated and joined together. The plates 21, 22, and 23 according to one or more embodiments are stainless steel. A refrigerant flow path 15 is formed inside the unit body 11. Hereinafter, the direction (normal to the plates) in which the plurality of plates 21, 22, and 23 are laminated is also referred to as a first direction. The direction (orthogonal to the first direction) parallel to the plate surfaces of the plates 21, 22, and 23 is also referred to as a second direction.

The plurality of plates 21, 22, and 23 have a first plate 21, a second plate 22 laminated to the first plate 21, and a third plate 23 laminated to the second plate 22. The adjacent plates 21, 22, and 23 are joined together by brazing.

The first plate 21 is disposed at both ends of the unit body 11 in the first direction. The first plate 21 is thinner than other second and third plates 22 and 23. The first plate 21 is provided with a connection cylinder 21b that is a protrusion protruding toward the outside of the unit body 11 in the first direction. The connection cylinder 21b is formed in a cylindrical shape. The cylinder axis of the connection cylinder 21b is parallel to the first direction. The interior of the connection cylinder 21b constitutes a first opening 21a. The first opening 21a is a circular hole penetrating the first plate 21. A total of three first openings 21a are illustrated in the two first plates 21 illustrated in FIG. 3. The connection cylinder 21b and the first opening 21a are formed by burring the first plate 21.

The second plate 22 is located second from both ends of the unit body 11 in the first direction. The second plate 22 is formed thicker than the first plate 21. For example, if the thickness of the first plate 21 is 1 mm, the thickness of the second plate 22 can be 4 mm, which is four times the thickness of the first plate 21. A second opening 22a is formed in the second plate 22. The second opening 22a is a circular hole penetrating the second plate 22.

A total of three second openings 22a are illustrated in the two second plates 22 illustrated in FIG. 3. The second openings 22a each communicate with the first opening 21a of the first plate 21. The first opening 21a and the second opening 22a have the same inner diameter.

Note that, in the first plate 21 on one side (upper side) illustrated in FIG. 3, two first openings 21a (connection cylinders 21b) are illustrated on the left and right, and the diameters thereof are different from each other. Similarly, in the second plate 22 on one side (upper side) illustrated in FIG. 3, the two second openings 22a are illustrated on the left and right, and the diameters thereof are different from each other.

The third plate 23 is disposed between the two second plates 22 that are spaced apart in the first direction. In one or more embodiments, three third plates 23 are laminated between the two second plates 22. Each of the third plates 23 is formed to have the same thickness as that of the second plate 22. Therefore, the second plate 22 and the third plate 23 can be formed by processing the same material.

The third plate 23 is formed with a third opening 23a that constitutes the refrigerant flow path 15. The third opening 23a is a hole penetrating the third plate 23 or a slit extending in the second direction. In the example illustrated in FIG. 3, the third opening 23a is formed in the range across the two second openings 22a of the second plate 22 on one side. The third opening 23a communicates with the second openings 22a of the second plates 22.

The first to third plates 21, 22, and 23 may be materials other than stainless steel, such as aluminum, aluminum alloys, and iron.

Figure 4:
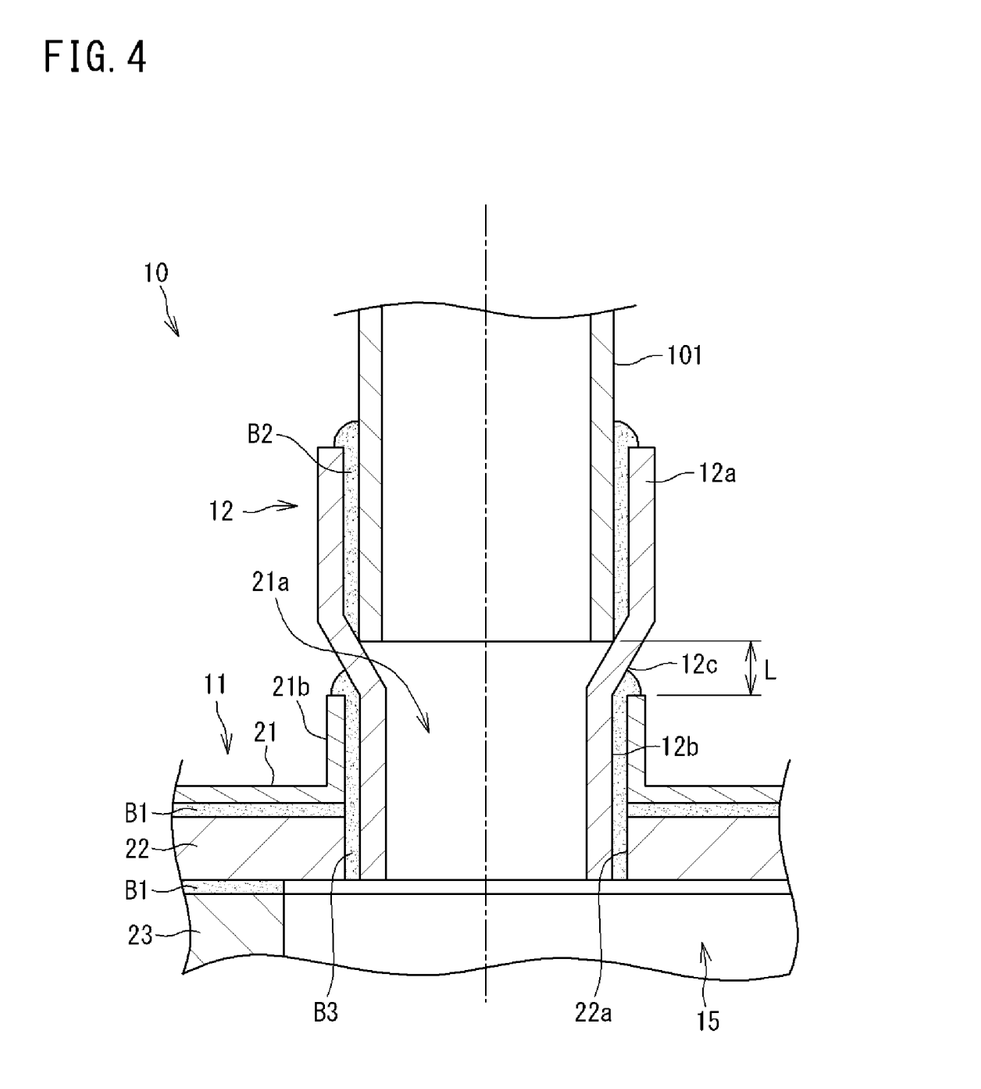
FIG. 4 is an enlarged cross-sectional view illustrating the joint between a unit body and a refrigerant pipe.

FIG. 4 is an enlarged cross-sectional view illustrating the joint between the unit body and the refrigerant pipe.

The first joint pipe 12 is attached to the first plate 21 and the second plate 22 arranged on one side (upper side in FIG. 3) in the first direction. The first joint pipe 12 has a large-diameter portion 12a at one end in the pipe axis direction, a small-diameter portion 12b at the other end, and a stepped portion 12c in the middle. The large-diameter portion 12a and the small-diameter portion 12b have a cylindrical shape. The diameter of the large-diameter portion 12a is larger than the diameter of the small-diameter portion 12b. The stepped portion 12c is formed in a conical shape such that the diameter gradually decreases from the large-diameter portion 12a toward the small-diameter portion 12b.

The small-diameter portion 12b of the first joint pipe 12 is inserted into the first opening 21a and the second opening 22a. The length of the small-diameter portion 12b in the pipe axis direction is almost the same as the sum of the length of the connection cylinder 21b in the first direction and the length of the second opening 22a (the thickness of the second plate 22). The outer peripheral surface of the small-diameter portion 12b of the first joint pipe 12 is joined to the inner peripheral surface of the first opening 21a and the inner peripheral surface of the second opening 22a by brazing with a brazing filler metal (first brazing filler metal) B3.

Note that the inner peripheral surface of the first opening 21a means the surface of the first plate 21 which forms the first opening 21a. Similarly, the inner peripheral surface of the second opening 22a means the surface of the second plate 22 which forms the second opening 22a.

The first joint pipe 12 according to one or more embodiments is formed from a material containing copper as a main component, such as copper or a copper alloy. However, the first joint pipe 12 may be formed from other materials such as stainless steel, aluminum, aluminum alloys, and iron.

Another refrigerant pipe 101 is connected to the large-diameter portion 12a of the first joint pipe 12. The refrigerant pipe 101 extends from, for example, the four-way switching valve 61 or the electric valve 62 as illustrated in FIG. 1. In general, the refrigerant pipe 101 of this type is formed from a material containing copper as a main component, such as copper or a copper alloy. One end of the refrigerant pipe 101 is inserted into the large-diameter portion 12a of the first joint pipe 12, and the outer peripheral surface of the refrigerant pipe 101 and the inner peripheral surface of the large-diameter portion 12a are joined by brazing with a brazing filler metal B2.

Two first joint pipes 12 are connected to the left and right sides of the first and second plates 21 and 22 on one side (upper side) illustrated in FIG. 3, and have different diameters and different lengths in the pipe axis direction. The first joint pipe 12 (denoted by reference sign 51 in FIG. 3) having a larger diameter is joined to the inner peripheral surfaces of a first opening 21a1 and a second opening 22a1 having larger diameters. The first joint pipe 12 (denoted by reference sign 52 in FIG. 3) having a smaller diameter is joined to the inner peripheral surfaces of a first opening 21a2 and a second opening 22a2 having smaller diameters.

A connection cylinder 21b1 forming the first opening 21a1 having a larger diameter is longer in the first direction than a connection cylinder 21b2 forming the first opening 21a2 having a smaller diameter. Therefore, the length of the joint in the first direction between the first joint pipe 51 having a larger diameter and the first and second plates 21 and 22 is greater than the length of the joint in the first direction between the first joint pipe 52 having a smaller diameter and the first and second plates 21 and 22.

Note that the first joint pipe 12 may have a constant diameter without the large-diameter portion 12a, the small-diameter portion 12b, and the stepped portion 12c.

As illustrated in FIG. 3, the second joint pipe (refrigerant pipe) 13 is attached to the first plate 21 and the second plate 22 arranged on the other side (lower side in FIG. 3) in the first direction. Another refrigerant pipe 102 connected to a container, such as a compressor or an accumulator, is connected to the second joint pipe 13. One end 13a of the second joint pipe 13 is inserted into the first opening 21a and the second opening 22a. The outer peripheral surface of the second joint pipe 13 is joined to the inner peripheral surface of the first opening 21a and the inner peripheral surface of the second opening 22a by brazing with the brazing filler metal (first brazing filler metal) B3.

The second joint pipe 13 has the end 13a that is connected to the first and second plates 21 and 22, a curved portion 13b that curves 90° from the end 13a, and a straight portion 13c that extends from the curved portion 13b along the second direction. As illustrated in FIG. 2, the other end 13d of the refrigerant pipe 102 is disposed so as to face upward or to the side with the refrigerant flow path unit 10 in a standing orientation. Therefore, the refrigerant pipe 102 extending from a container such as a compressor can be easily connected to the other end 13d of the second joint pipe 13 by burner brazing or the like. One end of the refrigerant pipe 102 is inserted into the other end 13d of the second joint pipe 13, and the outer peripheral surface of the refrigerant pipe 102 and the inner peripheral surface of the other end 13d are joined by brazing with the brazing filler metal B2.

As shown in FIG. 3 and FIG. 4, a bronze brazing filler metal is used for the brazing filler metal (second brazing filler metal) B1 that joins the plurality of plates 21, 22, and 23 together. A bronze brazing filler metal is also used for the brazing filler metal (first brazing filler metal) B3 that joins the first plate 21 and the second plate 22 to the first joint pipe 12. A bronze brazing filler metal is also used for the brazing filler metal (first brazing filler metal) B3 that joins the first and second plates 21 and 22 to the second joint pipe 13. Meanwhile, a phosphor-copper brazing filler metal is used for the brazing filler metal B2 that joins the first joint pipe 12 to the refrigerant pipe 101. A phosphor-copper brazing filler metal is also used for the brazing filler metal B2 that joins the second joint pipe 13 to the refrigerant pipe 102. As the bronze brazing filler metal, for example, BCu-3 is used. As the phosphor-copper brazing filler metal, for example, BCuP-2 is used.

The brazing filler metals B1 and B3 have melting points higher than the brazing filler metal B2.

Since the brazing filler metal B1 and the brazing filler metal B3 are the same brazing filler metal, the melting points thereof are the same. However, the brazing filler metal B1 and the brazing filler metal B3 may be different materials and have the same melting point. The brazing filler metal B1 and the brazing filler metal B3 may be different materials and have different melting points.

The joining together of the plurality of plates 21, 22, and 23 and the joining of the first and second plates 21 and 22 to the first and second joint pipes 12 and 13 are performed by in-furnace brazing. Specifically, first, the sheet-shaped brazing filler metal B1 is set between the plates 21, 22, and 23. In addition, the ring-shaped brazing filler metal B3 is set between the connection cylinder 21b of one of the first plates 21 and the first joint pipe 12. Further, the ring-shaped brazing filler metal B3 is set between the connection cylinder 21b of the other first plate 21 and the second joint pipe 13. These are introduced into a furnace heated to a temperature, for example, about 1040° C., at which the brazing filler metals B1 and B3 can be melted, and brazing is performed. As described above, the refrigerant flow path unit 10 is manufactured.

The first and second joint pipes 12 and 13 of the refrigerant flow path unit 10 manufactured as described above are joined to other refrigerant pipes 101 and 102, respectively, by burner brazing with the brazing filler metal B2. When the refrigerant pipes 101 and 102 are joined to the first and second joint pipes 12 and 13 by burner brazing, the heat of the burner is transferred not only to the first and second joint pipes 12 and 13 but also to the unit body 11 by radiation or heat conduction. In particular, the unit body 11 is formed in a block shape by laminating the plurality of plates 21, 22, and 23 and has a large heat capacity, and thus easily absorbs heat from the burner. Therefore, heat is also easily transferred to the brazing filler metal B1 that joins the plurality of plates 21, 22, and 23 together. In one or more embodiments, the brazing filler metal B1 used has a melting point higher than that of the brazing filler metal B2. Therefore, by heating the brazing filler metal B2 (and the first and second joint pipes 12 and 13 and refrigerant pipes 101 and 102 therearound) at a temperature lower than the melting point of the brazing filler metal B1 and higher than the melting point of the brazing filler metal B2, it is possible to suppress the brazing filler metal B1 from melting due to the heat during the joining of the first and second joint pipes 12 and 13 to the refrigerant pipes 101 and 102.

The melting point of the brazing filler metal B3, which joins the first plate 21 and the second plate 22 to the first and second joint pipes 12 and 13, is also higher than the melting point of the brazing filler metal B2. Therefore, it is possible to suppress the brazing filler metal B3 from melting due to the heat during the joining of the first and second joint pipes 12 and 13 to the refrigerant pipes 101 and 102.

In one or more embodiments, as illustrated in FIG. 4, the distance L between the connection cylinder 21b of the first plate 21 and the refrigerant pipe 101 attached to the large-diameter portion 12a of the first joint pipe 12 is, for example, 100 mm or less. If the distance L between the connection cylinder 21b and the refrigerant pipe 101 is set in this manner, the heat of the burner is more easily transferred to the unit body 11, and therefore it is more effective to set the melting points of the brazing filler metals B1, B2, and B3 as described above.

As illustrated in FIG. 3, the second joint pipe 13 is formed longer than the first joint pipe 12 in the pipe axis direction. The distance between the connection cylinder 21b of the first plate 21 and the refrigerant pipe 102 connected to the second joint pipe 13 exceeds 100 mm. Therefore, the heat of the burner for brazing the second joint pipe 13 to the refrigerant pipe 102 is less likely to be transferred to the unit body 11 due to heat conduction than the first joint pipe 12. However, the second joint pipe 13 is curved 900 partway, and the other end 13d to which the refrigerant pipe 102 is connected is closer to the unit body 11. Therefore, the heat of the burner is easily transferred to the unit body 11 by radiation. Therefore, similarly to the first joint pipe 12, the refrigerant pipe 102 may be connected to the second joint pipe 13 using the brazing filler metal B2 having a melting point lower than that of the brazing filler metal B1.

Embodiments 2

Figure 5:
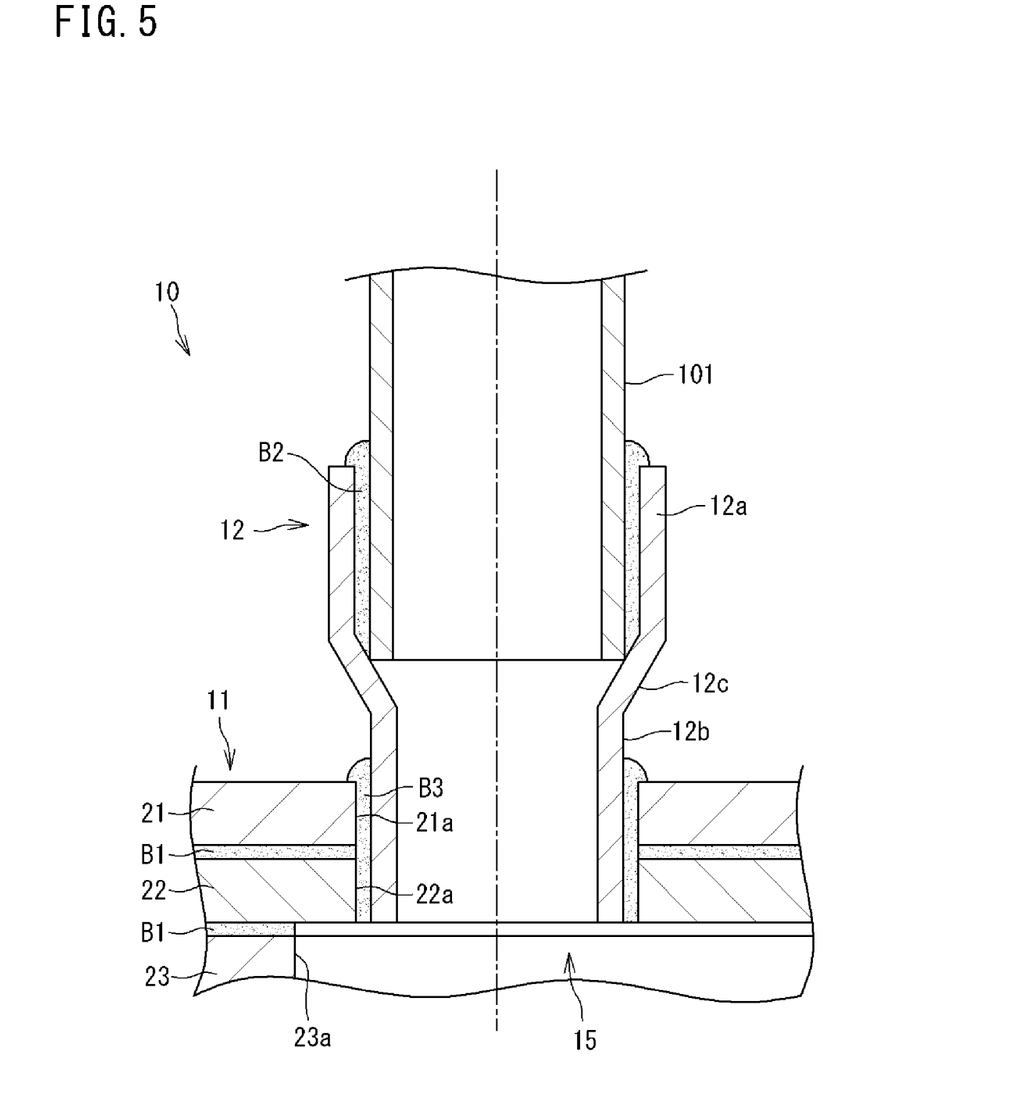
FIG. 5 is an enlarged cross-sectional view illustrating the joint between the unit body and the refrigerant pipe of a refrigerant flow path unit according to second embodiments.

FIG. 5 is an enlarged cross-sectional view illustrating the joint between the unit body and the refrigerant pipe of a refrigerant flow path unit according to second embodiments.

In the refrigerant flow path unit 10 according to one or more embodiments, the first plate 21 disposed at both ends in the first direction among the plurality of plates constituting the unit body 11 does not include the connection cylinder 21b such as in the first embodiments. The first joint pipe 12 is inserted into the first opening 21a formed in the first plate 21 and the second opening 22a formed in the second plate 22, and is joined to the inner peripheral surface of the first opening 21a and the inner peripheral surface of the second opening 22a by the brazing filler metal B3.

The first plate 21 according to one or more embodiments has the same thickness as those of the second plate 22 and the third plate 23 in order to ensure a length to be joined to the first joint pipe 12. The unit body 11 is composed of a total of five or more plates 21, 22, and 23: the two first plates 21 on both sides in the first direction; the two second plates 22 each laminated to the corresponding one of the first plates 21; and the one or more third plates 23 arranged between the two second plates 22.

Although not illustrated, similarly to the first joint pipe 12, the second joint pipe 13 (see FIG. 3) is inserted into the first opening 21a formed in the first plate 21 having the same thickness as that of the second plate 22 and the second opening 22a formed in the second plate 22, and is joined by the brazing filler metal B3.

Other configurations are similar to those of the first embodiments. Also in one or more embodiments, the relationship between the melting points of the brazing filler metals B1, B2, and B3 is similar to that of the first embodiments.

Embodiments 3

Figure 6:
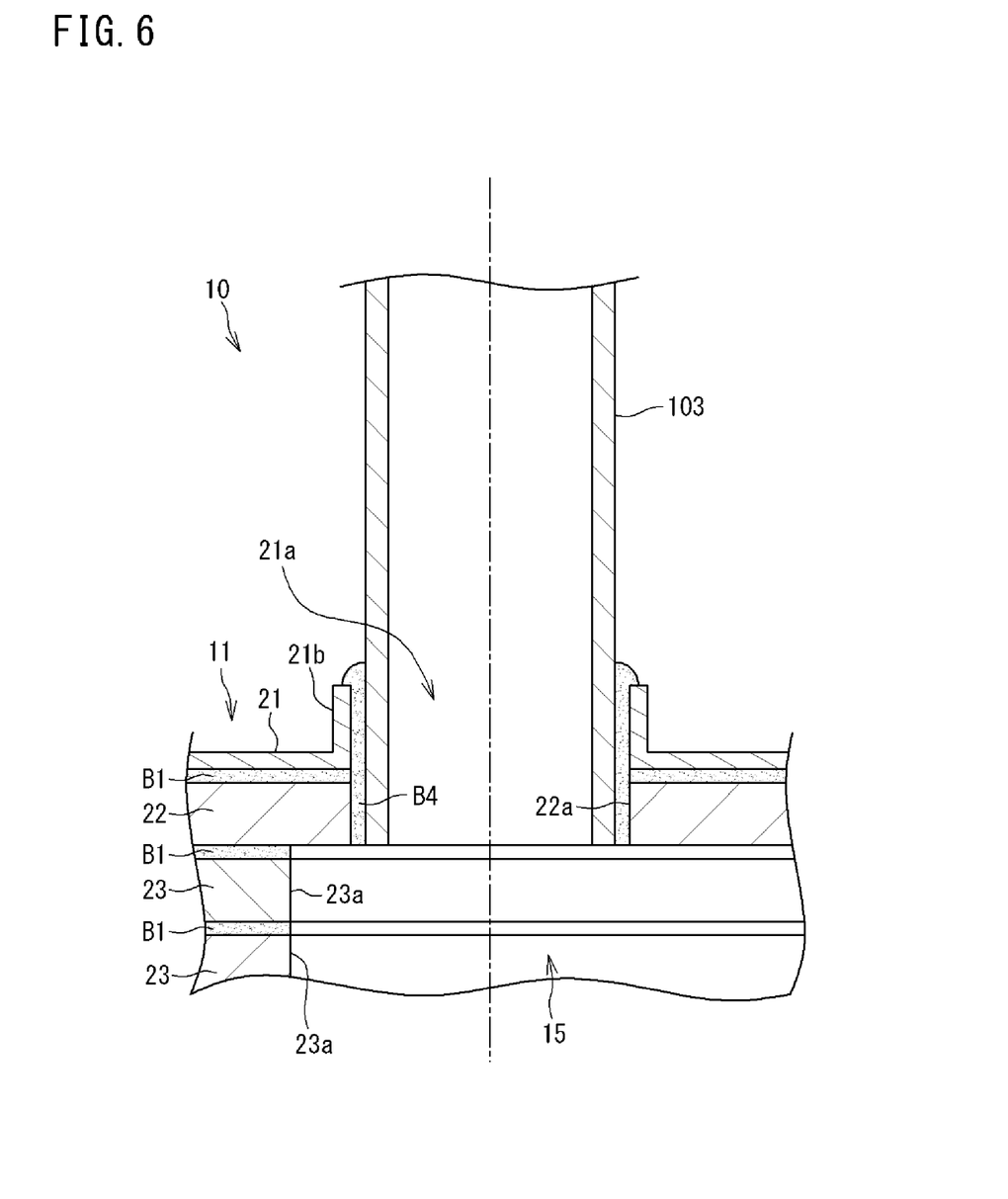
FIG. 6 is an enlarged cross-sectional view illustrating the joint between the unit body and the refrigerant pipe of a refrigerant flow path unit according to third embodiments.

FIG. 6 is an enlarged cross-sectional view illustrating the joint between the unit body and the refrigerant pipe of a refrigerant flow path unit according to third embodiments.

In the refrigerant flow path unit 10 according to one or more embodiments, the configuration of the plates 21, 22, and 23 of the unit body 11 is similar to that of the unit body 11 illustrated in FIG. 3 and FIG. 4, but does not include the first joint pipe 12. Although not illustrated, the refrigerant flow path unit 10 according to one or more embodiments also does not include the second joint pipe 13.

A refrigerant pipe 103 is directly inserted into the first opening 21a of the first plate 21 and the second opening 22a of the second plate 22, and the inner peripheral surface of the first opening 21a and the inner peripheral surface of the second opening 22a are brazed to the outer peripheral surface of the refrigerant pipe 103 by a brazing filler metal (first brazing filler metal) B4. The brazing filler metal B4 has a melting point lower than the brazing filler metal B1. The refrigerant pipe 103 is joined to the unit body 11 by burner brazing or the like.

In the example illustrated in FIG. 6, the first plate 21 has the connection cylinder 21b, but the connection cylinder 21b may be omitted. In this case, similarly to the second embodiments, in order to ensure the length of the joint between the first plate and the refrigerant pipe 103, the thickness of the first plate 21 may be set to be substantially the same as that of the second plate 22.

Embodiments 4

Figure 7:
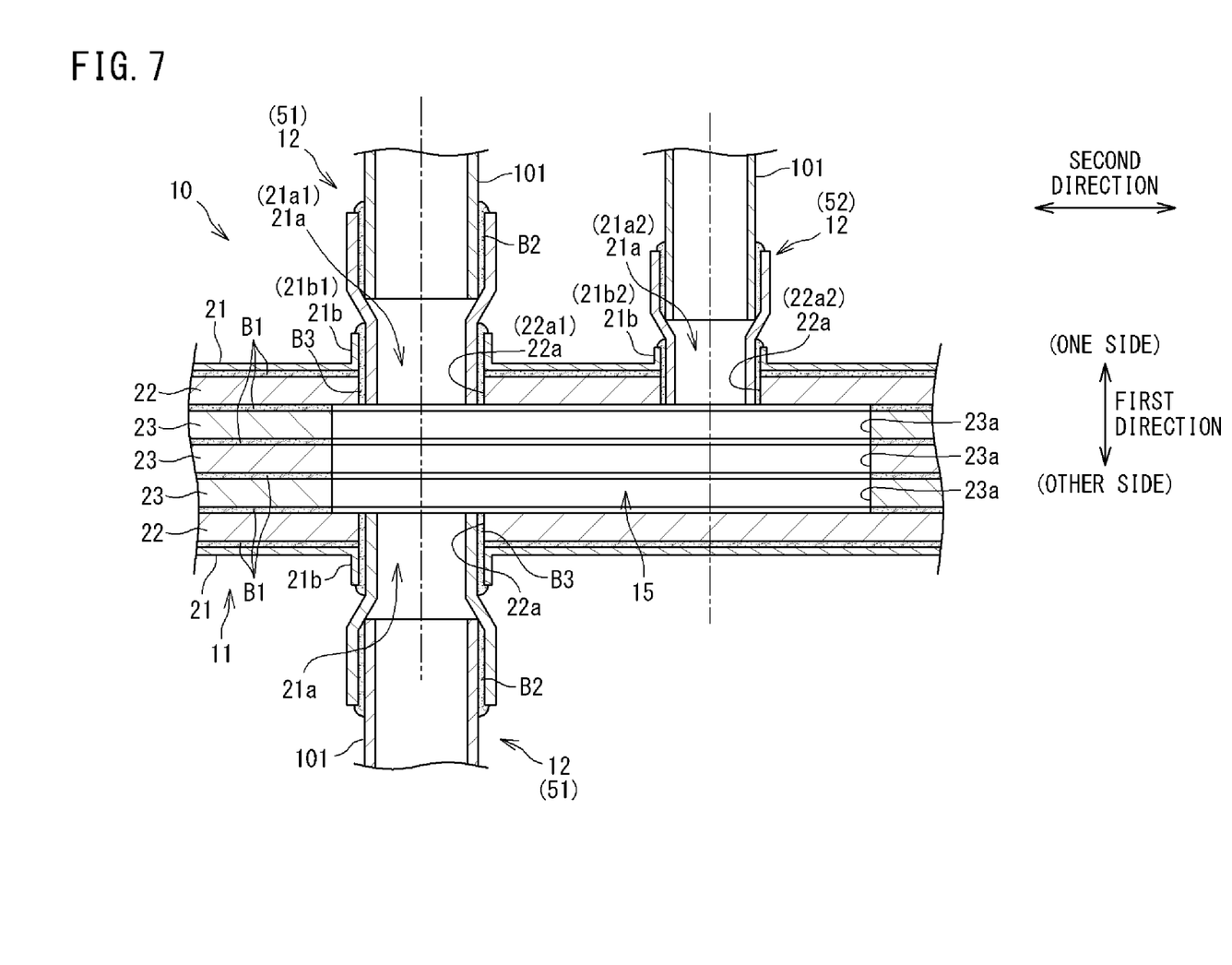
FIG. 7 is a cross-sectional view of portions of a refrigerant flow path unit according to fourth embodiments.

FIG. 7 is a cross-sectional view of portions of a refrigerant flow path unit according to fourth embodiments.

In the refrigerant flow path unit 10 according to one or more embodiments, the first joint pipe 12 is provided on both sides of the unit body 11 in the first direction, and the refrigerant pipe 101 is connected to the first joint pipe 12. Other configurations are almost the same as those of the first embodiments.

Action and Effects of Embodiments

In the technology described in Patent Literature 1, the hole formed in the upper substrate and the auxiliary pipe are joined by brazing. However, for example, since vibration is transmitted to the joint between the auxiliary pipe connected to the compressor and the hole, it is required to firmly join the auxiliary pipe to the hole. One or more embodiments of the present disclosure firmly join a refrigerant pipe to plates that constitute a refrigerant flow path unit.

Action and Effects (1) The refrigerant flow path unit 10 according to each of the above embodiments includes: a unit body 11 including a plurality of plates 21, 22, and 23 that are laminated together, and having an interior in which the refrigerant flow path 15 is formed; a joint pipe 12, 13 that serves as a refrigerant pipe or refrigerant pipe 103; and a first brazing filler metal B3, B4 that joins the unit body 11 to the refrigerant pipe 12, 13, 103. The unit body 11 includes the first plate 21 formed with the first opening 21a and the second plate 22 formed with the second opening 22a that communicates with the first opening 21a, the second plate 22 being laminated to the first plate 21. The refrigerant pipe 12, 13, 103 is inserted into the first opening 21a and the second opening 22a. The first brazing filler metal B3, B4 joins the inner peripheral surface of the first opening 21a and the inner peripheral surface of the second opening 22a to the outer peripheral surface of the refrigerant pipe 12, 13, 103.

In the refrigerant flow path unit 10 having the above configuration, since the refrigerant pipe 12, 13, 103 is joined across the two plates 21 and 22, the length of the joint between the unit body 11 and the refrigerant pipe 12, 13, 103 can be increased and the joint strength can be increased. Therefore, for example, if a component that generates vibration such as a compressor is connected to the refrigerant pipe 12, 13, 103, the influence of the vibration on the joint between the refrigerant pipe 12, 13, 103 and the unit body 11 can be suppressed. Specifically, in the above embodiments, the second joint pipe 13 serving as a refrigerant pipe is connected to the refrigerant pipe 102 that is connected to the compressor of the air conditioner.

(2) In the above embodiments, the refrigerant flow path unit 10 further includes the second brazing filler metal B1 that joins the first plate 21 to the second plate 22. The first brazing filler metal B3 and the second brazing filler metal B1 have the same melting point. Therefore, if the joining of the first plate 21 to the second plate 22 and the joining of the first plate 21 and the second plate 22 to the refrigerant pipes 12 and 13 are simultaneously performed by in-furnace brazing, temperature management in the furnace can be easily performed.

(3) In the first and third embodiments, the first plate 21 is thinner than the second plate 22. Therefore, the weight of the refrigerant flow path unit 10 can be reduced.

(4) In the first and third embodiments, the first plate 21 includes the connection cylinder 21b serving as a cylindrical protrusion that protrudes in the direction in which the first plate 21 and the second plate 22 are laminated, and that forms the first opening 21a. Therefore, the refrigerant pipe 12, 13, 103 is inserted into the first opening 21a, which is formed in the interior of the connection cylinder 21b, and the second opening 22a, and the inner peripheral surface of the first opening 21a and the inner peripheral surface of the second opening 22a are joined to the outer peripheral surface of the refrigerant pipe 12, 13, 103 by the first brazing filler metal B3, B4, thereby allowing a greater length of the joint between the first and second plates 21 and 22 and the refrigerant pipe 12, 13, 103.

If the first plate 21 is thinner than the second plate 22, the processing for forming the connection cylinder 21b on the first plate 21 can be easily performed.

(5) In each of the above embodiments, the refrigerant pipe exemplified by the first joint pipe 12 includes the first refrigerant pipe 51 and the second refrigerant pipe 52 having a diameter smaller than the diameter of the first refrigerant pipe 51, and the first refrigerant pipe 51 has a greater joint length to be joined to the first plate 21 and the second plate 22 in the pipe axis direction than that of the second refrigerant pipe 52. Therefore, the first refrigerant pipe 51 having a larger diameter can be joined to the unit body 11 with greater joint strength than that of the second refrigerant pipe 52 having a smaller diameter.

Note that the present disclosure is not limited to the above exemplification, but is indicated by the claims, and is intended to include all modifications within the meaning and scope equivalent to the claims.

For example, the number of plates constituting the unit body 11 is not limited to the above embodiments, and the refrigerant flow path unit according to the present disclosure only needs to include the first plate and the second plate. In addition, the unit body 11 of the refrigerant flow path unit 10 is not limited to the plate shape, but may take any form such as a block shape.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 10 refrigerant flow path unit
11 unit body
12 first joint pipe (refrigerant pipe)
13 second joint pipe (refrigerant pipe)
21 first plate
21a first opening
21b connection cylinder (protrusion)
22 second plate
22a second opening
103 refrigerant pipe
B1 brazing filler metal (second brazing filler metal)
B3 brazing filler metal (first brazing filler metal)
B4 brazing filler metal (first brazing filler metal)

What is claimed is:

1. A refrigerant flow path unit comprising:
a unit body that:
   comprises plates that are laminated together, and
   has an interior in which a refrigerant flow path is formed;
a refrigerant pipe; and
a first brazing filler metal that joins the unit body to the refrigerant pipe, wherein
the plates of the unit body include:
   a first plate that has a first opening and is disposed at an end of the unit body in a first direction in which the plates are laminated; and
   a second plate that has a second opening that communicates with the first opening and is disposed second from the end of the unit body in the first direction,
the refrigerant pipe is inserted into the first opening and the second opening,
the first brazing filler metal joins an inner peripheral surface of the first opening and an inner peripheral surface of the second opening to an outer peripheral surface of the refrigerant pipe, and
the first plate is thinner than the second plate.

2. The refrigerant flow path unit according to claim 1, wherein the refrigerant pipe is connected to another refrigerant pipe that is connected to a compressor of an air conditioner.

3. The refrigerant flow path unit according to claim 1, further comprising a second brazing filler metal that joins the first plate to the second plate.

4. The refrigerant flow path unit according to claim 3, wherein a melting point of the first brazing filler metal is equal to a melting point of the second brazing filler metal.

5. The refrigerant flow path unit according to claim 1, wherein the first plate comprises a cylindrical protrusion that:
   protrudes in a direction in which the first plate and the second plate are laminated, and
   forms the first opening.

6. A refrigeration apparatus comprising the refrigerant flow path unit according to claim 1.

7. A refrigerant flow path unit comprising:
a unit body that:
   comprise plates that are laminated together, and
   has an interior in which a refrigerant flow path is formed;
a refrigerant pipe; and
a first brazing filler metal that joins the unit body to the refrigerant pipe, wherein
the plates of the unit body include:
   a first plate that has a first opening; and
   a second plate that has a second opening that communicates with the first opening and is laminated to the first plate,
the refrigerant pipe is inserted into the first opening and the second opening,
the first brazing filler metal joins an inner peripheral surface of the first opening and an inner peripheral surface of the second opening to an outer peripheral surface of the refrigerant pipe,
the refrigerant pipe comprises:
   a first refrigerant pipe; and
   a second refrigerant pipe having a diameter smaller than a diameter of the first refrigerant pipe, and
the first refrigerant pipe has a greater joint length to be joined to the first plate and the second plate in a pipe axis direction than that of the second refrigerant pipe.

8. The refrigerant flow path unit according to claim 7, wherein the refrigerant pipe is connected to another refrigerant pipe that is connected to a compressor of an air conditioner.

9. The refrigerant flow path unit according to claim 7, further comprising a second brazing filler metal that joins the first plate to the second plate.

10. The refrigerant flow path unit according to claim 9, wherein a melting point of the first brazing filler metal is equal to a melting point of the second brazing filler metal.

11. The refrigerant flow path unit according to claim 7, wherein the first plate comprises a cylindrical protrusion that:
   protrudes in a direction in which the first plate and the second plate are laminated, and
   forms the first opening.

12. A refrigeration apparatus comprising the refrigerant flow path unit according to claim 7.

* * * * *